UNITED STATES PATENT OFFICE.

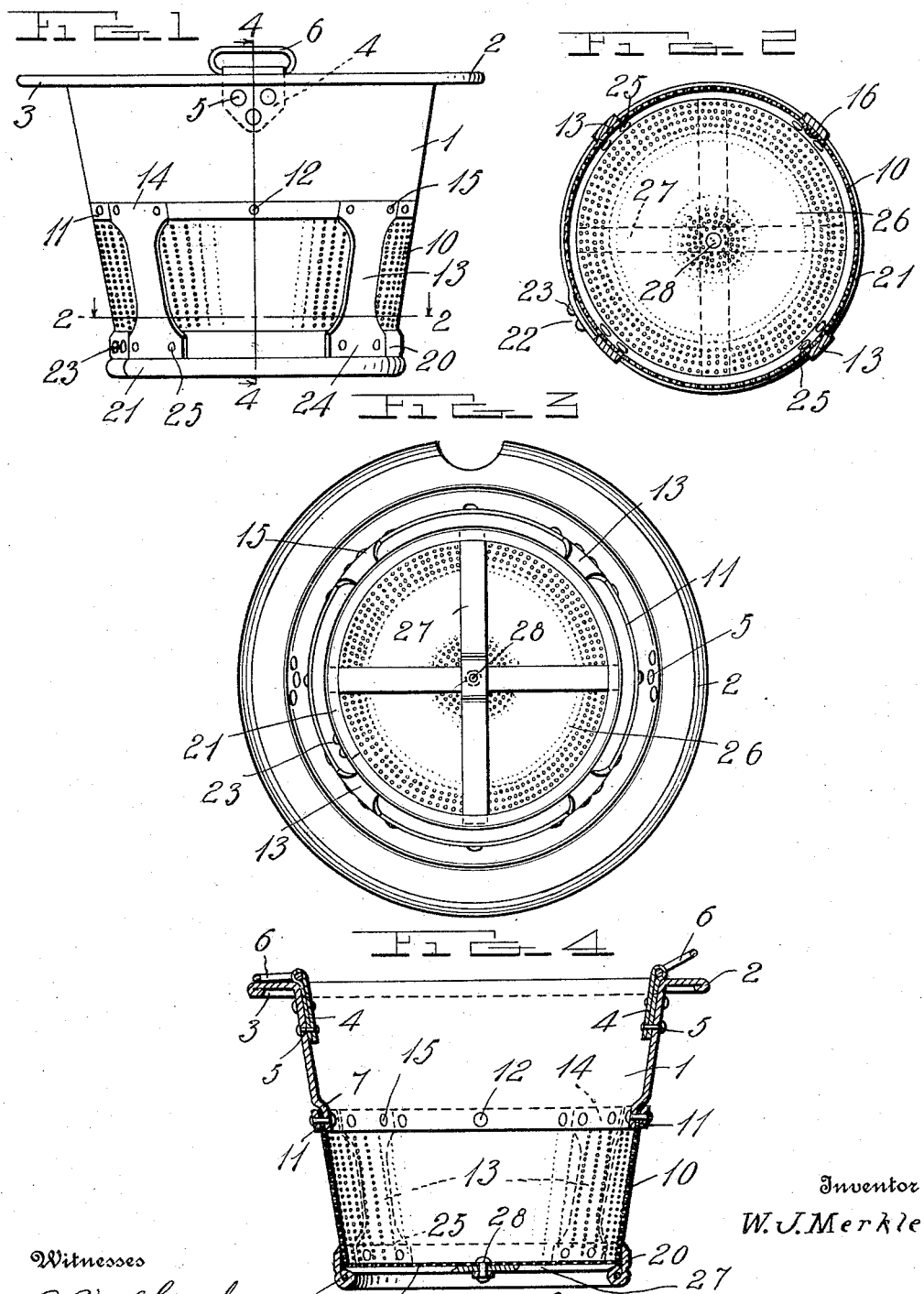

WILLIAM J. MERKLE, OF COLUMBUS, OHIO.

STRAINER.

1,067,935.

Specification of Letters Patent.  Patented July 22, 1913.

Application filed September 3, 1912.  Serial No. 718,362.

*To all whom it may concern:*

Be it known that I, WILLIAM J. MERKLE, a citizen of the United States, residing at Columbus, in the county of Franklin and State of Ohio, have invented certain new and useful Improvements in Strainers; and I do declare the following to be a full, clear, and exact description of the invention, such as will enable others skilled in the art to which it appertains to make and use the same.

This invention relates to domestic cooking vessels, and more especially to coffee pots; and the object of the same is to produce an improved sanitary strainer for large coffee pots or urns, made entirely of aluminum so that it will not rust, is extremely light, and possesses the greatest amount of strength for the least weight of metal. This and other objects are accomplished by constructing the strainer in the manner hereinafter more fully described and claimed, and as shown in the drawings wherein—

Figure 1 is a side elevation, and Fig. 2 a horizontal section on the line 2—2 of Fig. 1; Fig. 3 is a bottom view of this device on a slightly larger scale; and, Fig. 4 is a vertical section on the line 4—4 of Fig. 1.

This improved strainer is composed entirely of aluminum, having the shape of the frustum of a cone inverted, with a radial flange around its larger upper end whereby it is supported in the mouth of the coffee pot or urn, the upper or larger portion of the conical body being closed or imperforate so that the steam is stocked within the urn, and the lower portion and the flat bottom being perforate. In order to use as little of the expensive material as possible, and yet give the device the requisite strength, I follow certain details of construction as will now be amplified.

The imperforate portion 1 is by preference spun from aluminum without any seams and extends about half way down the height of the entire strainer, and its upper edge is spun outward in a horizontal flange 2 whose extreme outer edge is in turn crimped or turned inward as at 3 so as to form a bead and leave no raw edges of the metal. Secured to this member of the strainer, preferably on the inside thereof, are two ears 4, each of which may be strap metal folded over upon itself and riveted in place as at 5, and each ear carries a handle 6 whereby the device is lifted. The lower edge of the imperforate portion 1 is deflected inward a trifle and then continued downward in a flange 7 slightly smaller in circumference than the smallest circumference of the body itself, and therefore producing a shoulder around the exterior of this flange for a purpose to appear.

The perforate or lower portion or half of the strainer is by preference made up of a sheet 10 of aluminum pierced with a series of very fine holes so that it is foraminous. This sheet is initially cut in the shape of a long strip, slightly curved throughout its length, and when brought into place it is bent around within the shoulder formed by the internal flange 7, and held in place against the outer face of said flange by means of strips 11 and rivets 12 passing through the strips, the foraminous sheet, and the flange 7. These strips are interrupted by I shaped members 13 whose bodies stand outside said foraminous portion 10 and whose heads 14 fill out the spaces between the extremities of the strips 11 and are riveted as at 15 the same as said strips are riveted at 12. Thereby is produced a composite ring surrounding the upper edge of the foraminous strip or sheet and filling out the general contour of the body to cause it to set into the recess formed by deflecting the flange 7 inward as above described. The extremities of the strip 10 from which the foraminous portion is composed are by preference overlapped and crimped to each other as shown at 16, at a point which lies inside the body of one of the I shaped members 13.

The bottom of this improved strainer is composed of a band 20 having an inwardly turned bead 21 around its lower edge and on which the entire device rests when it is removed from the coffee pot or urn, the ends of the band overlapping as at 22 and being riveted to each other as at 23. I would prefer that the outer of the overlapping ends shall lie against the lower head 24 of one of said I shaped members, as best seen in Fig. 2, and thereby the general contour of the lower end of the device is maintained. The body of the band surrounds the lower edge of the foraminous sheet and may be riveted thereto although I find that ordinarily the rivets 25 which secure the lower heads 24 of the I shaped members to the band may be passed through the latter and through the foraminous sheet and will hold all parts in place. The numeral 26 designates a foraminous disk, also formed of a sheet of light aluminum provided with many fine perforations, and the edges of this disk underlie the lower edges of the foraminous sheet 10 and are sustained by the bead 21. Finally I would produce a spider 27 of aluminum strips crossing each other and riveted together at their centers as at 28, its body standing beneath the bottom 26 and supporting the same and the extremities of its arms overlying said bead 21; and the use of this spider permits a rather light sheet or disk of aluminum to be employed for the foraminous bottom, while yet giving the parts sufficient strength to enable them to be built of large size and produce a strainer of great capacity.

What is claimed as new is:

1. The herein described coffee urn strainer of inverted frusto-conical shape comprising an imperforate upper portion having its lower edge deflected inwardly and thence downwardly to produce an annular recess, a foraminous lower portion whose upper edge is seated in the recess, a foraminous bottom, an imperforate band around the lower edge of the foraminous portion and having an inturned bead at its lower edge standing beneath the edge of the foraminous bottom, upright members whose lower ends are secured outside said band and whose upper ends are secured in said recess of the imperforate portion, and strips filling out said recess between the upper ends of said members.

2. The herein described coffee urn strainer of inverted frusto-conical shape comprising an imperforate upper portion having its lower edge deflected inwardly and thence downwardly into a flange, a foraminous lower portion whose upper edge surrounds said flange, a foraminous disk forming the bottom of said lower portion, an imperforate band having a body which surrounds the lower edge of said foraminous portion and an inturned bead at the lower edge of said body standing beneath the edge of said foraminous disk, and means for connecting said parts.

3. The herein described coffee urn strainer of inverted frusto-conical shape comprising an imperforate upper portion having a radial flange around its upper edge and its lower edge deflected inwardly and thence downwardly into a flange, a foraminous lower portion whose upper edge is seated in the recess formed by said flange, a foraminous bottom, an imperforate band around the lower edge of the foraminous portion and having an inturned bead at its lower edge standing beneath the edge of the foraminous bottom, I shaped members whose lower heads are secured outside said band and whose upper heads are secured in said recess of the imperforate portion, and strips filling out said recess between the heads of the I shaped members.

In testimony whereof I have hereunto set my hand in presence of two subscribing witnesses.

WILLIAM J. MERKLE.

Witnesses:
ROLLAND C. MARLOWE,
BERT. S. WARD.

---

Copies of this patent may be obtained for five cents each, by addressing the "Commissioner of Patents, Washington, D. C."